United States Patent
Rao

(10) Patent No.: US 9,557,210 B2
(45) Date of Patent: Jan. 31, 2017

(54) METHOD FOR NON-INTRUSIVE ON-LINE DETECTION OF TURBINE BLADE CONDITION

(75) Inventor: Aswathanarayan Rama Rao, Mumbai (IN)

(73) Assignee: THE SECRETARY, DEPARTMENT OF ATOMIC ENERGY, GOVT. OF INDIA, Mumbai (IN)

( * ) Notice: Subject to any disclaimer, the term of this patent is extended or adjusted under 35 U.S.C. 154(b) by 718 days.

(21) Appl. No.: 12/525,358

(22) PCT Filed: Feb. 2, 2007

(86) PCT No.: PCT/IN2007/000042
§ 371 (c)(1),
(2), (4) Date: Jul. 31, 2009

(87) PCT Pub. No.: WO2008/093349
PCT Pub. Date: Aug. 7, 2008

(65) Prior Publication Data
US 2010/0030493 A1    Feb. 4, 2010

(51) Int. Cl.
*G06F 19/00*   (2011.01)
*G01H 17/00*   (2006.01)
*G01H 11/00*   (2006.01)
*G01H 1/00*    (2006.01)

(52) U.S. Cl.
CPC ................... *G01H 1/003* (2013.01)

(58) Field of Classification Search
CPC .................................................. G01H 1/003
USPC ....... 702/34, 35, 59, 75, 141, 159, 171, 185, 702/189, 36, 56; 73/592, 598, 600, 865.8, 73/861.18
See application file for complete search history.

(56) References Cited

U.S. PATENT DOCUMENTS

| 4,408,294 A | 10/1983 | Imam |
| 5,152,172 A | 10/1992 | Leon |
| 6,301,967 B1 * | 10/2001 | Donskoy et al. ............... 73/579 |
| 6,474,166 B1 | 11/2002 | Osawa |

(Continued)

OTHER PUBLICATIONS

A. Rama Rao, In-Situ and Non-Intrusive Measurement Technique for Detection of Turbine Blade Vibrations, 2005, Reactor Engineering Division Bhabha Atomic Research Centre, Founder's Day Special Issue, pp. 7-13.*

(Continued)

*Primary Examiner* — John Breene
*Assistant Examiner* — Yaritza H Perez Bermudez
(74) *Attorney, Agent, or Firm* — Robert Plotkin, P.C.; Robert Plotkin

(57) ABSTRACT

A system for on-line detection of incipient cracks in turbine blades to serve as early warning system for turbine blade failure. The system of non-intrusive detection of turbine blade condition of the invention is simple and cost effective and would enable assessing the health of the turbine blade during plant operation, which is extremely important for the safe operation of the turbine in an operating power plant. The present method and system of identifying the presence of modulated blade passing frequency (BPF) for blade vibration that is not correlatable to the change in the operating condition and would thus be indicative of presence of cracked blades with incipient cracking. It is capable for verifying the Campbell diagram and ascertain the margin available between the natural frequency of the blade/stage and the steam excitation frequencies/engine orders.

15 Claims, 9 Drawing Sheets

(56) References Cited

U.S. PATENT DOCUMENTS

2007/0258807 A1* 11/2007 Brummel .................... 415/118
2009/0222228 A1* 9/2009 Gao et al. .................... 702/67

OTHER PUBLICATIONS

International Search Report dated Kuly 4, 2008 issued for PCT/IN2007/000042.
Rama Rao,A."In-Situ and non-intrusive measurement technique for detection of turbine blade vibrations"; BARC Newsletter, Founder'S Day Special Issue No. 261, Oct. 2005.

* cited by examiner

METHOD FOR NON-INTRUSIVE ON-LINE DETECTION OF TURBINE BLADE CONDITION

CROSS REFERENCE TO RELATED APPLICATIONS

This is a national stage application of PCT/IN2007/000042 filed 2 Feb. 2007.

FIELD OF THE INVENTION

The present invention relates to detection of turbine blade natural frequency and, in particular, to a method and system for on-line detection of incipient cracks in turbine blades while in operation to serve as early warning system for turbine blade failure. Advantageously, the technique of non-intrusive detection of turbine blade condition of the invention is simple and cost effective and would enable assessing the health of the turbine blade during plant operation. The invention would favour development of turbines and its users to know the health of the turbine blades/stages of turbine in an operating power plant, which is extremely important for the safe operation of the turbine. The method and system of the invention would favour early detection of blade crack which would avoid any extensive damage which can be caused if the crack is left undetected. Considering that good health of the turbine is very important for smooth operation of power plants and the like since even if one blade is damaged the consequence is risky and costly, the invention would enable on-line monitoring of health of turbine blade and avoid such complexities of turbine failure and/or related productivity/operation losses.

BACKGROUND ART

It is well known that good health of turbines are required for its smooth operation and also the monitoring of the condition of turbine is important to maintain uniformity of operation and operative power output from turbines.

In order to assess the turbine health and in particular the turbine blade condition, measurement of turbine blade vibration has been known and followed in the art. Turbines are basically fluid flow machines where moving blades are subject to high loads. In case of any alternating stress it is usual to cause vibration related failures in the blades and in order to ascertain high load condition the measurement of vibration states of the blades have been known to be carried out. Such measurement of the vibration of the blades has been practiced and some of the methods followed in the art are as discussed hereunder.

U.S. Pat. No. 4,996,880 discloses an operating turbine monitor incorporating one or more acoustic sensors positioned inside the turbine next to a blade row of a rotor, an analog digital converter, a tachometer sensor at the rotor shaft, a memory, a synchronous averaging circuit, a sub tractor circuit, and a comparator. The patent was directed to overcoming the problem of monitoring an operating turbine for order related turbine blade vibration and for non order-related turbine blade vibration as well as for other turbine conditions.

U.S. Pat. No. 4,518,917 discloses yet another manner of measurement of vibration of turbine blades. A plurality of proximity sensors are disposed in a turbine flow guide inside the turbine to measure flow guide-to-turbine blade tip distance at various points around the flow guide. The sensor signals are detected and the peak-to-peak voltage of the detected signals provides an indication of the desired distance measurement. The signals are also monitored and if ambient operating conditions causes the signals to exceed predetermined positive or negative thresholds, corrective signals are generated so as to bring the detected signal back into an acceptable range. A proximity sensor is also provided to measure axial movement of the rotor to which the blades are attached so that the other sensor signals can be modified as a function of the measured axial position.

It is also known to provide systems for measurement of blade vibration wherein non-contacting probes are installed inside the turbine to monitor the vibration of tip of the blades in each stage. The probe monitored the displacement of the tip of individual blade and estimated the stress therefrom. However, such non contact measurement of vibration of moving blades presently available are either complex to obtain or are subject to inaccurate measurement of vibration in blades.

U.S. Pat. No. 6,761,528 is directed to such measurement of vibration of moving blades in a non-contact manner and basically relates to steam turbine comprising an optical measuring system for measuring a moving blade vibration. In the said system a transmitter is adapted to produce a light beam which strikes the moving blades and is reflected by these into a receiver. Importantly, as disclosed in said patent by providing the transmitter separate from the receiver the system is stated to achieve reduction of the scattered light effect of the steam to enable a reliable optical measurement of the blade vibration.

It would be apparent from the above that for measurement of blade vibration the systems presently available are either complex or have limitations of inaccurate measurement of blade vibration or in case of the intrusive systems the same is again either very complex or suffer from complexities of unwanted exposure of the sensors/detectors to severe conditions prevailing inside the turbine. Thus, on exposure of such sensors/detectors to such severe conditions inside turbine the systems are prone to failure and malfunctioning of the vibration measurement adding to the problems of reliability of such systems. Moreover, such systems are also not suited to determine the natural frequency of the turbine blades nor can the same serve for the much desired early detection of blade crack.

OBJECTS OF THE INVENTION

It is thus the basic object of the present invention to provide a reliable and yet non-intrusive method and system for measuring blade natural frequencies while in operation to serve as early warning of turbine blade failure.

Another object of the present invention is directed to a non-intrusive online method for detection of incipient cracks in turbine blades prior to its failure such that the same can add to the safety all kinds of turbine by way of an early warning system in case of failure of turbine blade due to cracking.

Yet another object of the present invention is directed to a non-intrusive method and system for determining blade natural frequency which would avoid exposing the sensors/detectors to severe conditions prevailing inside the turbine and consequential failure and malfunctioning affecting reliability of turbines.

A further object of the present invention is directed to a method and system of non-intrusive detection of incipient cracks in turbine blades making selective and advantageous application of the interaction of the rotating blades of turbine in the presence of flowing fluid with the turbine casing, thereby providing for the much required non-intrusive measurement of blade vibration.

A further object of the present invention is directed to non-intrusive sensor based arrangement for ascertaining turbine blade condition, in particular, online monitoring of turbine blade condition and provide for a safe and reliable mode of acquisition of vibration signals and determining blade passing frequency and the related amplitude of BPF indicative health of the blades.

A further object of the present invention is directed to co-relate by way of a simple and cost effective method and system the trend of vibration and the process data in an operating turbine and in the process determine the cause of blade vibration and possible indication of presence of cracked blades with incipient cracking.

A further object or the present invention is to provide for a method and system for early detection of crack in blades so as to avoid any unwanted significant modulation in BPF by way of possible identification of even only one damaged/incipient crack in blade in any stage of a turbine which is capable of inducing enough vibration to bring about modulation of BPF.

A further object of the present invention is directed to a method and system of identifying the presence of modulated BPF for blade vibration that is not correlatable to the change in the operating condition and would thus be indicative of presence of cracked blades with incipient cracking.

A further object of the present invention is directed to the development of turbines which would favour users to know condition of the blade/stage and its natural frequency during plant operation and would be directed to ensure steady value of natural frequency for healthy operation.

Another object of the present invention is directed to a method and system of developing turbines and safe and productive use of turbines by further providing for verifying the Campbell diagram and to know the margins available between natural frequency of the blade/stage and the steam excitation frequencies/engine orders for controlled operation and use of turbines.

Another object of the present invention is directed to a method and system for detecting crack in blades and turbines and provide for typical range of blade vibration indicative of blade crack condition including crack in the blades like in its roots or in the body of the blades.

A further object of the present invention is directed to identifying components that generally have high amplitude compared to the amplitude of BPF and which contribute to bearing and shaft vibration and identifying the amplitude and frequency component which modulate low amplitude high frequency component BPF and in the process provide for identification of modulation of BPF other than such high amplitude low frequency component as indicative of symptoms of blade cracks.

A further object of the present invention is directed to a method and system of crack identification of turbine blade which also favour developing margins available between excitation frequency and natural frequency and its verification with possible change in natural frequency attributable to changing condition in blade/stage.

SUMMARY OF THE INVENTION

Thus according to the basic aspect of the present invention there is provided a method for non-intrusive on-line detection of turbine blade condition comprising:

placing sensor/vibration detector means non-intrusively on the outer casing of the operating turbine to sense the blade vibration and generate vibration signals/data;

identifying turbine process parameter data;

acquiring and analysis the said vibration signals/data and said turbine process parameter data and carrying out correlation analysis for detection of presence of distinguishing features in the pattern of vibration/signals from blades in order and those having incipient cracks.

Preferably, in the above method for non-intrusive on-line detection of turbine blade condition the vibration signals are obtained as output from accelerometers placed suitably on the outer casing of an operating turbine and real time process data are obtained from a control panel. The said sensor means used can be selected from contact and non-contact sensors preferably accelerometers.

For the said correlation analysis the signals are acquired in the very low and very high frequency ranges for early detection of the cracked blade.

It is thus possible by way of the above disclosed method of crack identification in turbine blades to effectively and advantageously utilize vibration signals as output of accelerometers selectively positioned non-intrusively on the turbine casing and provide for co-relation analysis of the same in relation to real time process data from the control panel such as to in the process detect cracked blade by the presence of features distinguishing pattern of vibration of healthy blade and the ones with incipient cracks.

In the above method, the blades excite the turbine casing at frequencies that correspond to blade passing frequency (BPF) which is a product of number of blades and operating speed. The amplitude of BPF is indicative of the condition of the turbine blade. The said modulated BPF constitutes a characteristic feature of vibration of rotating turbine blades in an operating turbine. Importantly, the presence of modulated BPF or blade vibration which is not correctable to the change in the operating conditions is identified as an indication of presence of cracked blade/s with incipient cracking. Also the deviation of the amplitude of BPF from normal indicates blade crack condition.

In accordance with a preferred aspect of the invention in the above method for non-intrusive on-line detection of turbine blade condition the presence of defective blade is detected by analyzing the side bands of the BPF which appear as a result of amplitude modulation of BPF by the defective blades. The method is also applicable for verifying the Campbell diagram and also to ascertain the margin available between the natural frequency of the blade/stage and the steam excitation frequencies/engine orders.

In accordance with further aspect of the invention the method for non-intrusive on-line detection of turbine blade condition comprises identifying the trend of the amplitude of the excited blade natural frequency compared with the trend of the blade passing frequency of the respective stages is used to bring out the strong correlation and cause and effect relationship to validate the detection.

In particular according to one aspect the method comprises on line exciting of steam turbine blades at its natural frequency by perturbing specific operating parameters and detecting the turbine blade natural frequency to validate the natural frequency information as per the Campbell diagram of the respective stages.

Importantly according to yet further aspect of the invention the said method for non-intrusive on-line detection of turbine blade condition is effective in identifying blade cracks by way of identifying the symptoms of crack in the blade based on modulations of BPF by other than high amplitude but low frequency components (25, 50 and 100 Hz).

The method for non-intrusive on-line detection of turbine blade condition further achieves the designing of margin available between excitation frequency and the natural frequency which can be verified and any change in the natural frequency attributed to changing condition in the blade/stage.

Preferably in accordance with an aspect of the invention in the method for non-intrusive on-line detection of turbine blade condition the amplitude of BPF at different time is stored and used for trending the amplitude of BPF. The invention further involving selective identification of the normal amplitude value of the BPF of about 1 $m/s^2$ which under severe conditions of blade crack is found to go up to a range of 4 to 10 $m/s^2$.

In accordance with another aspect of the present invention there is provided a system for non-intrusive on-line detection of turbine blade condition comprising:

- sensor means placed non-intrusively on the outer casing of the operating turbine to sense the blade vibration and generate vibration signals/data;
- means to identify and provide real time turbine process parameter data;
- a signal/data acquisition and analysis unit adapted to receive the said vibration signals/data and said turbine process parameter data and carry out correlation analysis including Campbell diagram for detection of presence of distinguishing features in the pattern of vibration/signals from blades in order and those having incipient cracks.

In the above system for non-intrusive on-line detection of turbine blade condition the sensors are positioned such that the path of transmission of vibration from inside to outside is along a rigid connection between inner and outer enclosure/casing preferably radial on the horizontal girder of the turbine in line with the stages more preferably within 100 mm from the centerline of each stage. The sensors means are selected from contact and non-contact sensors including accelerometers, acoustic and pressure sensors preferably accelerometers.

Advantageously, such a system for non-intrusive on-line detection of turbine blade condition is adaptable for all varieties of turbines.

In the system of the invention the rotating blades of turbine are adapted to interact in the presence of flowing fluid with the turbine casing to facilitate the non-intrusive measurement of blade vibrations with said accelerometers placed on the outer casing.

The amplitude of the blade passing frequency which is the product of the number of blades and the operating speed is indicative of health of the blade.

Importantly, the system is adapted such that even the presence of one defective blade or cracked blade in one stage induces significant modulation of BPF in that stage which is correlated to trend of vibration and process data for identifying the damaged blade and the stage.

The signal/data acquisition and analysis unit includes means for 3D spectrum plot which is obtained by transforming the vibration data amplitude versus time into frequency domain, in particular of zoomed portion of BPF for examination of variation on amplitude and frequency of BPF. The signal/data acquisition and analysis unit is adapted for identification of the side bands which appear as a result of modulation of BPF by some strong low frequency components of the blades or shaft of the turbine.

In the above system the rotating blades of turbine interacts in the presence of flowing fluid with the turbine casing and in such a way that facilitate non-intrusive measurement of blade vibration with the selectively placed sensor/accelerometer on its outer casing.

In accordance with a preferred aspect of the present invention it is found that although blade vibration as above would be monitored by many other contact and non-contact means, accelerometer constitute the most preferred mode of accession of vibration signals. The blades excite the turbine at frequencies that correspondence to blade passing frequency (BPF) which is product of number of blade and the operating speed. In particular, the system selectively utilizes the amplitude of BPF as indicative of and directed to the related health of the blade.

Like, that of under certain off normal operating condition, the incipient cracking in blade causes the rotating blade to vibrate. The vibrating rotating blades in turn modulate the BPF very significantly. It is found that the presence of only one defective or cracked blade in any stage can induce enough vibration to bring about significant modulation of BPF for that stage and which can be easily detected by the above system of the invention.

Thus, the invention makes selective and advantageous application of modulation of BPF and its identification as a characteristic feature of vibration of the rotating turbine blades in an operating turbine. The cause of the blade vibration can be detected following correlation of the trend of vibration and the process data. Importantly, the presence of modulated BPF of blade vibration that is not correlatable to the change in the operating condition is taken as an indication of presence of cracked blade with incipient cracking.

Irrespective of the cause of induction, the blades always vibrate at their natural frequency. The natural frequency of blade is first determined and then detected by analyzing accelerate output received during off normal operation in the low expected frequency range.

Preferably, in accordance with an aspect of the above system of the invention the sensors are positioned radial on the horizontal girder of the turbine in line with the stages. Preferably, the best position is within 100 mm. from the central line of each stage. In any variety of turbine the best path of transmission of vibration from inside to outside is along a rigid connection between inner and outer enclosures and the sensors for the purposes of the system of the invention can be selectively positioned non-intrusively on such rigid connection for effective path of transmission of the vibration.

Thus the invention achieves non-intrusive detection by way of advantageous use of the above system arrangement in turbines where the distance between the rotating blades the stationery structure is normally only a few millimeters. Thus in such an arrangement the stream issuing from the blades carry with it all the vibration characteristics of the blade and transfers it the stationery structure without much loss of information. The BPF which is the product of speed of operation and number of blades in each stage and the amplitude of BPF thus depends on the condition of the rotating blade. The variation of amplitude can be due to blade vibration and other process transmits. Usually, the amplitude value of BPF is found to be 1 $m/s^2$. However, in severe condition due to blade vibration the amplitude value go up to beyond 1 $m/s^2$. According to a further aspect of the invention it is found by way of invention that under blade crack condition the vibration can typically go up the range of 4-10 $m/s^2$. Such crack in the blade can be in its root or it can be in the body of the blade. The modulating frequency appears in the side band to the BPF. The presence of side band of BPF and increased amplitude of BPF together indicate the symptom of crack in the blade.

It is thus possible by way of the above invention to achieve non-intrusive detection of blade natural frequency in an operating power plant, which is important for the safe operation of the turbine, and help to detect early indication of crack in the blades of the turbine. The invention would therefore favour online monitoring of the health of the turbine blades.

The details of the invention, its objects and advantages are explained hereunder in greater detail in relation to non-limiting exemplary illustration of a system for carrying out the method of crack detection for advance warning of turbine blade failure of the invention as per the following accompanying figures:—

BRIEF DESCRIPTION OF THE ACCOMPANYING FIGURES

DETAILED DESCRIPTION OF THE ACCOMPANYING FIGURES

Figure 1:
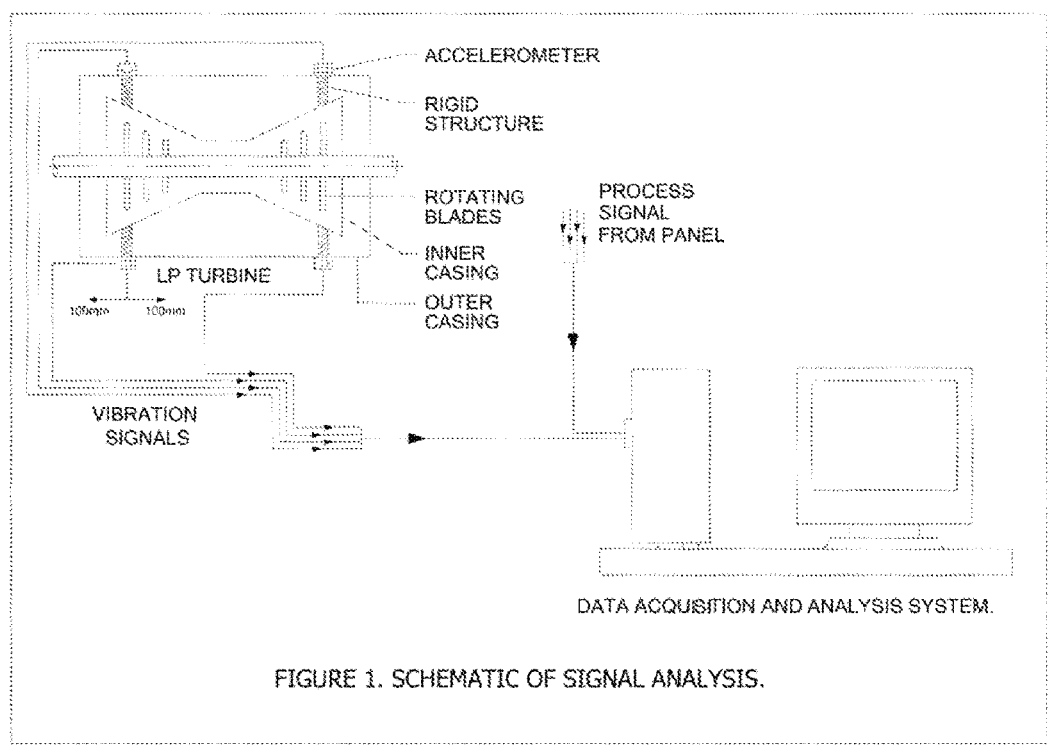
FIG. 1 is a schematic illustration of a system of non-intrusive blade natural frequency detection and crack identification in turbine blades in accordance with the present invention.

Reference is first invited to accompanying FIG. 1 which illustrates schematically an embodiment of the system for non-intrusive crack detection of turbine blades in accordance with the present invention. As apparent from said FIG. 1 the system is simple and basically involves simple input of vibration data (VD) which is obtained by suitably placing sensor means preferably accelerometer positioned radial on the horizontally girder of the turbine in line with the stages. More preferably the position of the sensors is kept within 100 mm. from the central line of its stage. The system also inputs the relevant process data (PD) of turbine operation to ascertain the off-normal operating parameters like wet steam, low load and other off-normal parameters, low frequency analysis of the signal measured during off-normal operation for detection of blade natural frequency amplitude, trend of the amplitude of the excited blade compared with the trend of the blade passing frequency of the respective stages to favour the correlation analysis.

The above input parameters are fed into a data acquisition and analysis system (DAA) adapted to facilitate the above correlation and determine the blade condition using the system.

Figure 2:
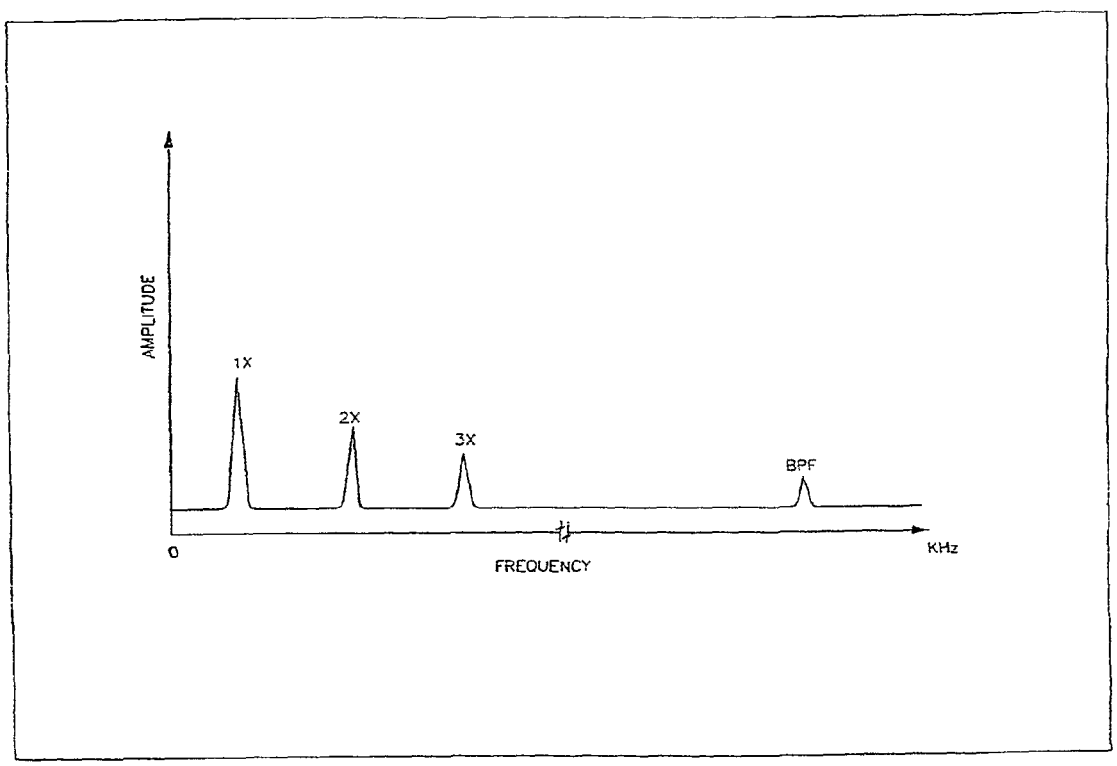
FIG. 2 is an illustration of a broad band vibration spectrum as obtained from an operating turbine.

As apparent from FIG. 2, by transforming the raw vibration data (amplitude versus time) collected from the LP Turbine to frequency domain, the amplitude versus frequency spectrum is obtained. Such a spectrum obtained by the system is adapted to give all the frequency component present in the raw time data. In the low frequency range, the signal consists of the unbalanced component (1×) and its harmonics. In high frequency range, the signal consists of BPF of different stages of the turbine rotor.

FIG. 2 is a specific illustration of such a spectrum which gives frequency components 1×(50 Hz), 2×(100 Hz) and so on while the BPF component is indicative of the blade passing frequency (BPF). The trend of amplitude of BPF is not different for different stages. Only the frequency is different. In a typical 3000 rpm. Steam turbine, vibration at frequency 25 Hz. corresponds to half speed whirl in the shaft, vibration in 50 Hz. correspondence to rotor unbalanced and vibration at 100 Hz. correspondence to misalignment or preloading in the coupling. These components generally have high amplitude compared to the amplitude of BPF and contribute to bearing and shaft vibration. High amplitude but low frequency components (25, 50 and 100 Hz.) modulate low amplitude high frequency component (BPF). This type of modulation does not indicate the symptom of cracking in the blade. Thus, the system identifies the modulation of BPF by other than 25, 50 and 100 Hz, which is indicative of the symptom of crack in the blade which could be identified by the present system of the invention.

Figure 3:
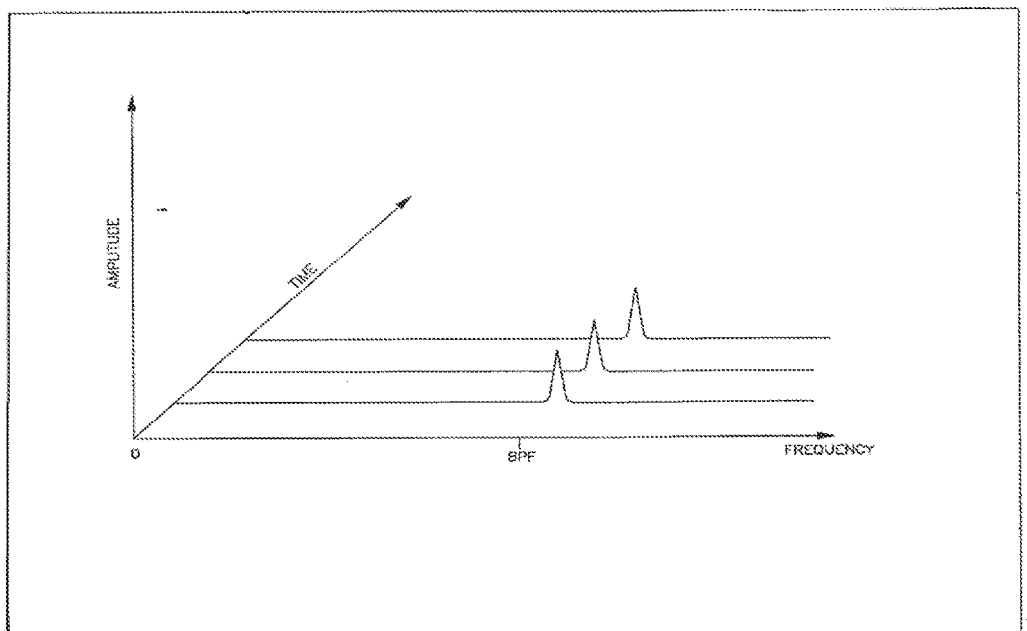
FIG. 3 is an illustration of a 3D spectrum of BPF produced for crack detection in accordance with the invention.

Reference is invited to FIG. 3 which shows the BPF components in the frequencies spectrum. In particular, the figure shows the 3D spectrum plot of the zoomed portion of BPF. The variation of amplitude and frequency of BPF is examined in large number of 3D spectrum plots generated by the system of the invention. Importantly, the system is adapted to generate long-term trend of the amplitude of BPF. In the time access the behavior of the BPF can be seen at each time. The amplitude of BPF at different time is stored and used for trending the amplitude of BPF.

Figure 4:
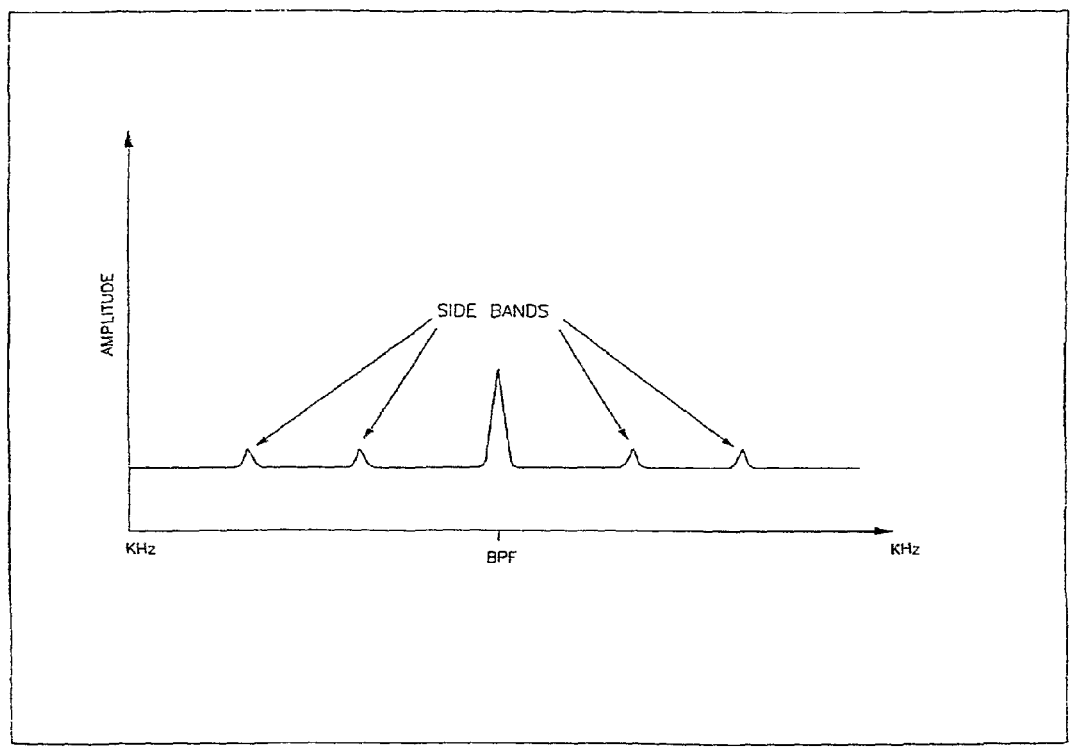
FIG. 4 is a spectrum showing BPF and side band indicative of crack in blades as determined following the method of the present invention.
Figure 5:
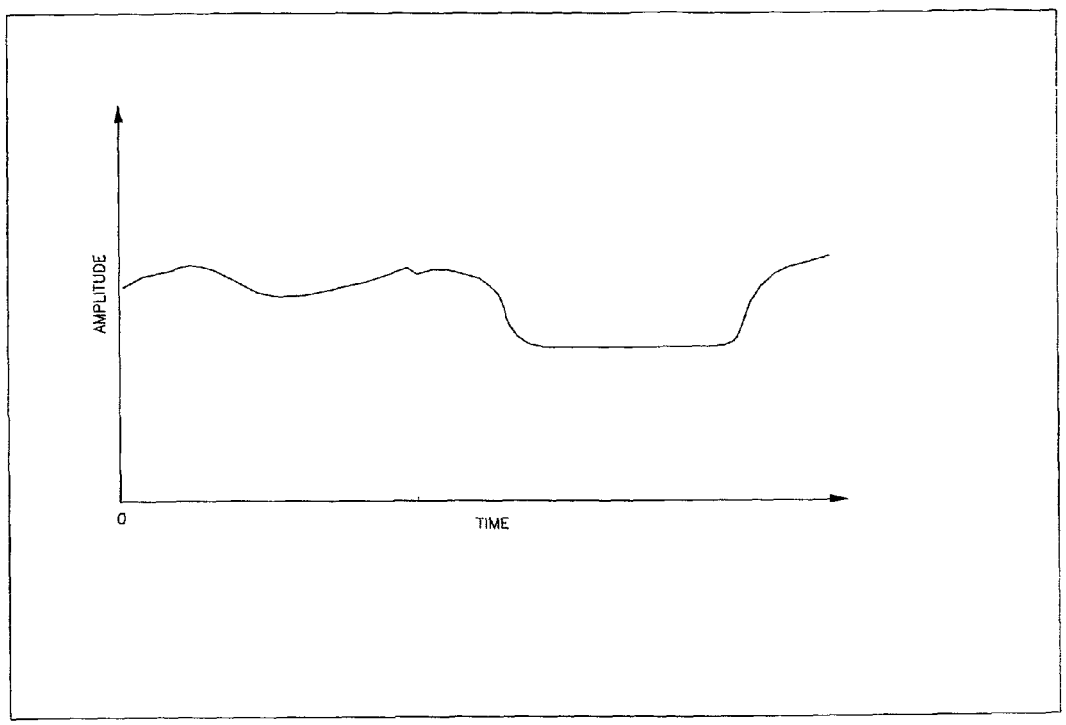
FIG. 5 is an illustration of amplitude trend of BPF in accordance with the method of crack detection of the present invention.

FIG. 4 is an illustration showing BPF at a particular time along with the side bands appearing as a result of modulation of BPF. The overall characteristics of BPF is a result of net participation of all the blades in the stage. Importantly, even if one blade cracks it disturbs the characteristics of the BPF and side bands can be identified. A crack of about 22 mm long in the body of the blade is found to generate a side band of about 80 dB (10,000 times) below the amplitude of BPF which can be detected. The dynamic range of measurement can be around 110 dB (100,000 times). In particular, the figure shows the typical amplitude trend of BPF (modulation) of one stage during normal and off normal operating conditions of the turbine. Amplitude variation is caused due to vibration of blades at its natural frequency. The blade natural frequency is detected by analyzing the signal in the expected range of frequency. FIG. 5 shows the typical amplitude trend of BPF where the variation in amplitude is due to blade vibration. The above FIGS. 4 and 5 thus illustrate the cause and effect of blade vibration identified by the system of the invention.

Figure 6:
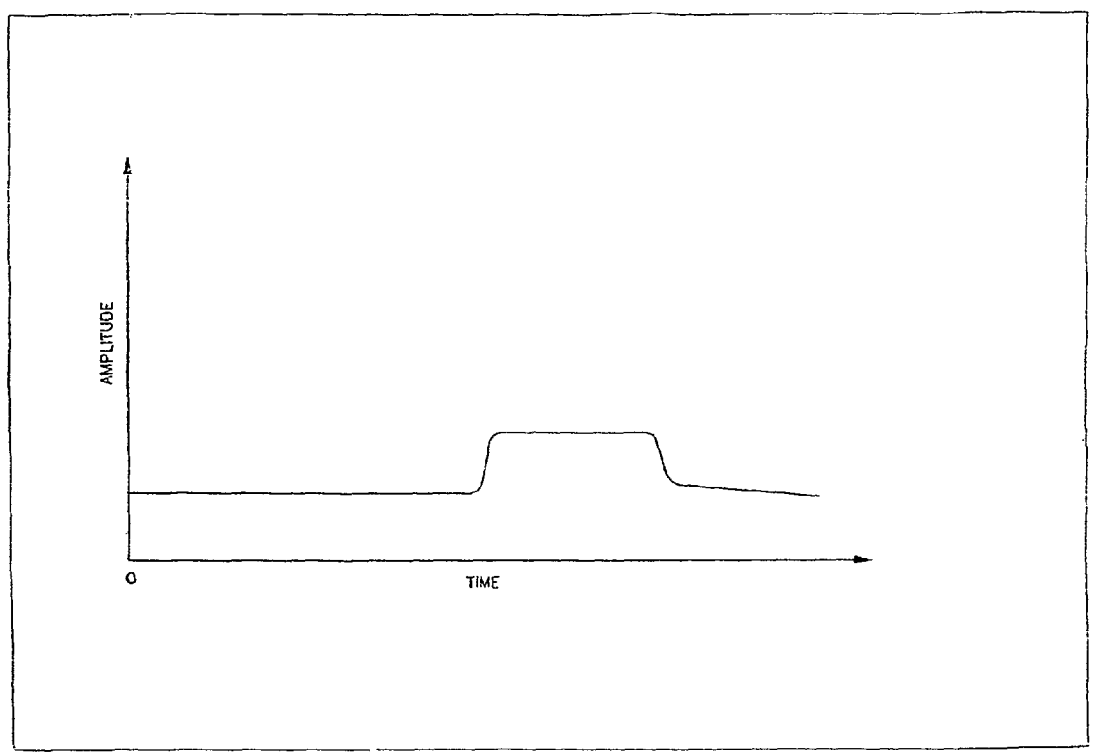
FIG. 6 is an illustration of amplitude of blade natural frequency used in the crack detection of the invention.

Reference is invited to FIG. 6, which shows the amplitude variation of natural frequency of blade. When it is excited by operating condition the blades vibrate with higher amplitude. When blades vibrate the amplitude of BPF reduces as indicated in FIG. 5.

Figure 7:
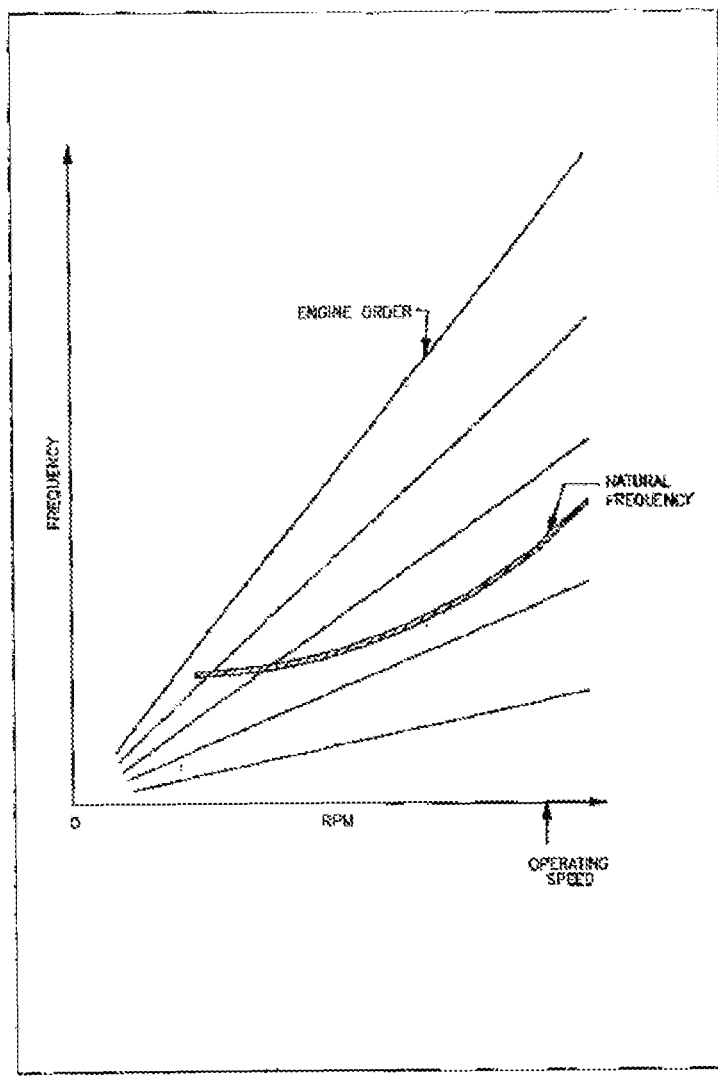
FIG. 7 is an illustration of typical Campbell diagram of a turbine stage.
Figure 8:
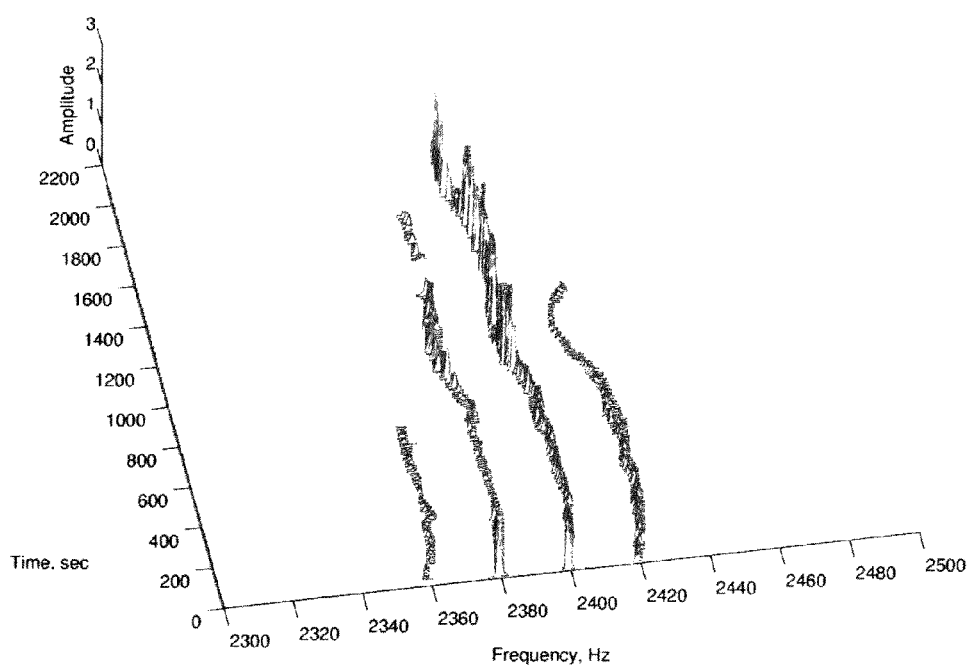
FIG. 8 is an illustration of a 3D spectrum of BPF of a stage with cracked blades as identified by the system of the invention.
Figure 9:
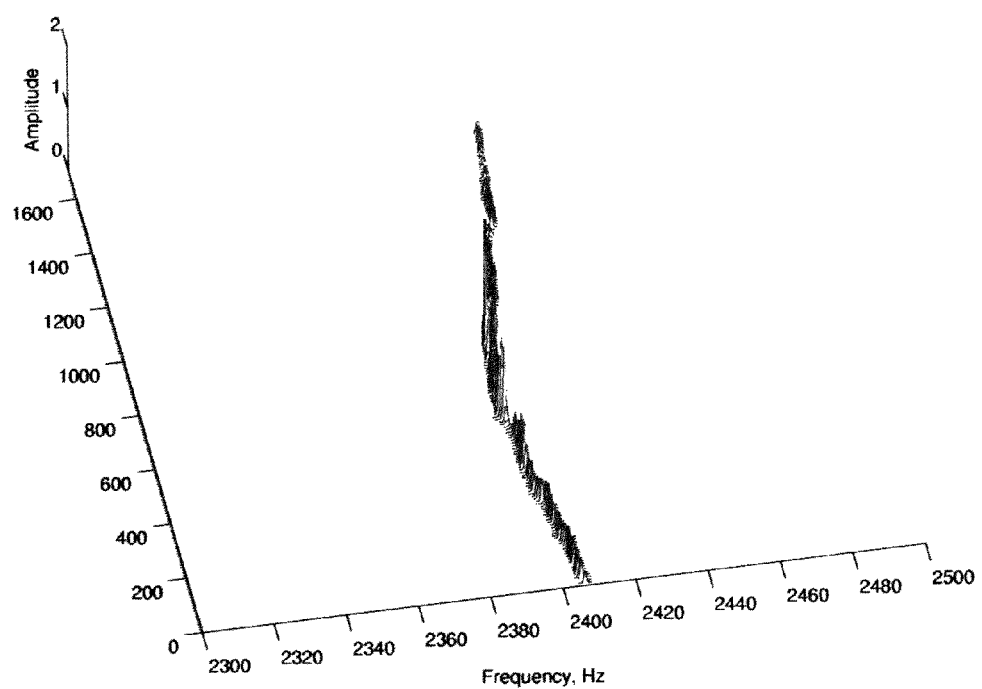
FIG. 9 is an illustration of 3D spectrum of BPF of the stage after replacement of cracked blades following crack detection by the system of the invention.

Reference is now invited to FIG. 7, which is an illustration of Campbell diagram of a particular stage normally supplied by the turbine manufacturer. It is the graph of (steam excitation) frequency versus turbine speed. At the operating speed, there has to be sufficient and safe margin between excitation frequency and the natural frequency of the turbine stage. The curve in the figure is an illustration of the value of natural frequency at different speed. Thus according to a further aspect of the invention, it is possible following the method and the system to verify the design natural frequency by the system given by the Campbell diagram of the respective stage as supplied by the manufacturer of the turbine and provide for a more confirmatory analysis and detection of cracks following the above non-intrusive method of the invention. FIG. 8 is an illustration of a 3D spectrum of BPF identifying a stage with cracked blade while FIG. 9 shows the change in the 3D spectrum of the BPF of the stage after replacement following early warning and crack detection of the cracked blade in accordance with the invention.

It is thus possible by way of the present invention to provide a reliable and yet non-intrusive method and system of advanced detection of incipient cracks in turbine, blades while in operation to serve as early warning of turbine blade failure. The present system would add to the safety all kinds of turbine by way of an early warning system in case of failure of turbine blade due to cracking. Importantly the system is reliable since the same avoids exposing the sensors/detectors to severe conditions prevailing inside the turbine and consequential failure and malfunctioning affecting reliability of turbines. Advantageously, the system would favour users to know condition of the blade/stage and its natural frequency during plant operation and would be directed to ensure steady value of natural frequency for healthy operation.

We claim:

1. A method for non-intrusive real time on-line detection of incipient crack of one or more blades in an operating steam or gas turbine for generating early warning of blade crack and its early replacement, the method comprising:
   A) placing sensor means non-intrusively on outer casing of said operating turbine to sense the blade vibration and generate blade vibration signals including raw vibration data amplitude versus time;
   B) obtaining real time turbine process parameter data from control panel of said operating turbine;
   C) acquiring said raw vibration data amplitude versus time and said turbine process parameter data in a data acquisition and analysis unit;
   D) transforming said raw vibration data amplitude versus time to frequency domain amplitude versus frequency spectrum including amplitude and frequency of blade passing frequency (BPF) in said data acquisition and analysis unit;
   E) carrying out correlation analysis in said data acquisition and analysis unit of the said amplitude versus frequency spectrum including amplitude and frequency of blade passing frequency (BPF) in relation to said turbine process parameter data for detection of presence of distinguishing features in pattern of vibrations of healthy blades and the ones with incipient cracks based on variation in said amplitude and frequency of BPF of said healthy blades and the ones with incipient cracks in any stage of different stages of turbine rotor by
      (i) identifying in any said stage of different stages of turbine rotor presence of side bands of blade passing frequency (BPF) resulting from any amplitude modulation of said BPF based on amplitude versus frequency spectrum;
      (ii) detecting incipient crack in one or more blades of the turbine at any of said different stages of turbine rotor based on any said thus identified of side bands of blade passing frequency (BPF) of step (i) above by:
         (a) trending the said amplitude modulation of BPF and identifying rise in amplitude of BPF as a condition of blade crack,
         (b) identifying based on long term amplitude trend of BPF and trend of amplitude of blade natural frequency the presence of modulated BPF which is not correlatable to changes in said real time turbine process parameter data obtained from control panel of said operating turbine of the said different stages of turbine rotor, and
         (c) finally detecting side bands of the BPF at any of said different stages of turbine rotor which appear only as a result of increased amplitude modulation of BPF by the cracked blades based on said data acquisition and analysis unit distinguishing features in patterns of the side bands of said BPF resulting from cracked blades and increased amplitude of BPF from that resulting from low frequency range components up to 100 Hz which consist of unbalanced component and its harmonics for real time on-line detection of incipient crack in one or more blades of any said stages of turbine rotor;
      (iii) generating an early warning system of blade crack at any said stage of the turbine for replacement of cracked blade in said stage; and
      (iv) replacing the detected cracked blade and repeating said steps (A) through (E) to confirm absence of any further said distinguishing patterns of vibrations of healthy blades and of blades with incipient cracks based on any unwanted variation in said amplitude and frequency of BPF of said healthy blades and of said blades with incipient cracks in any stage of the turbine rotor.

2. A method as claimed in claim 1 wherein said blade vibrations are sensed by said sensor means comprising accelerometers placed suitably on the outer casing of the operating turbine wherein rotating blades are adapted to interact in the presence of flowing fluid with the turbine casing to facilitate the non-intrusive measurement of blade vibrations and said turbine process parameter data comprise real time process data obtained from a control panel.

3. A method as claimed in claim 1 wherein said step (ii) (b) comprises:
   (i) examining variation in amplitude versus frequency of BPF based on long term amplitude trends of BPF
   (ii) using the typical amplitude trend of BPF modulation during normal and off normal operating conditions and typical amplitude trend due to blade vibration to ascertain the cause and effect of variations in amplitude trend of BPF.

4. A method as claimed in claim 1 wherein said sensor means used can be selected from contact and non-contact sensors preferably accelerometers.

5. A method as claimed in claim 1 wherein the blades excite the turbine casing at frequencies that correspond to blade passing frequency (BPF) which is a product of number of blades and operating speed.

6. A method as claimed in claim 1 wherein said step (ii) (b) comprises on line exciting of steam turbine blades at its natural frequency by perturbing specific operating parameters and detecting the turbine blade natural frequency in the casing vibration signal to validate the natural frequency information as per the Campbell diagram of the respective stages.

7. A method as claimed in claim 1 wherein the symptoms of crack in the blade are identified based on modulations of BPF by frequency components other than those which are related to operating speed of the turbine.

8. A method as claimed in claim 1 wherein the design margin available between excitation frequency and the natural frequency is verified and any change in the natural frequency attributed to changing condition in the blade or stage.

9. A method as claimed in claim 1 wherein the normal amplitude value of the BPF is 1 m/s$^2$ which under severe conditions of blade crack typically goes up to a range of 4 to 10 m/s$^2$ and the said variation in amplitude of the blade passing frequency is indicative of health of the blade.

10. A method as claimed in claim 1 wherein sensor means are positioned such that a path of transmission of vibration from inside to outside is along a rigid connection between inner and outer enclosure or casing.

11. A method as claimed in claim 10 wherein said rigid connection between inner and outer enclosure or casing is done radial on the horizontal girder of the turbine in line with the stages included within 100 mm from the centerline of each stage.

12. A system for non-intrusive real time on-line detection of incipient cracks of one or more blades in an operating turbine comprising:
  i) sensor means placed non-intrusively on the outer casing of the operating turbine to sense the blade vibration and generate blade vibration signals including raw vibration data amplitude versus time;
  ii) control panel generating real time turbine process parameter data;
  iii) data acquisition and analysis unit adapted to
    (a) receive the said blade vibration signals including raw vibration data amplitude versus time and said real time turbine process parameter data from said control panel
    (b) transform said blade vibration signals amplitude versus time into frequency domain amplitude versus frequency spectrum including amplitude and frequency of blade passing frequency (BPF)
    (c) generating long term trend of the amplitude of blade passing frequency and trend of amplitude of blade natural frequency and
    (d) carry out a correlation analysis, of the said amplitude versus frequency spectrum including amplitude and frequency of blade passing frequency (BPF) in relation to said turbine process parameter data for detection of presence of distinguishing features in pattern of vibrations of healthy blades and the ones with incipient cracks based on variation in said amplitude and frequency of BPF of said healthy blades and the ones with incipient cracks in any stage of different stages of turbine rotor, including:
      (i) identifying modulations in amplitude of blade passing frequency (BPF) which is indicative of the condition of the turbine blade by related presence of side bands of the blade passing frequency (BPF) resulting from such amplitude modulation of the said blade vibration signals in any stage of said turbine;
      (ii) detecting incipient crack in said any one or more blades of the turbine at any stage based on thus identified side bands of BPF due to amplitude modulation of the blade passing frequency (BPF) at any said stage of said turbine by:
        (a) identifying, based on said long term trend of the amplitude of BPF, the presence of modulated BPF by amplitudes which are not correlatable to the operating conditions by trending of the amplitude of the excited blade natural frequency compared with said long term amplitude trend of the amplitude of blade passing frequency of the respective any said stage of said turbine, and
        (b) identifying the side bands of the BPF at said turbine stage as a result of amplitude modulation of BPF by the cracked blades based on distinguishing features in patterns resulting from cracked blades from that resulting from low frequency range which consist of unbalanced component and its harmonics, at any said stage of said turbine for real time on-line detection of the incipient crack in said one or more blades of the turbine;
  (viii) an early warning system for warning of a blade crack at any said stage of the turbine for early replacement of the cracked blade in said stage; and
  (iv) replacing said cracked blade and using the sensor to further sense said blade vibrations and further generate said blade vibration signals including raw vibration data amplitude versus time, said control panel provided for post replacement of cracked blade to further generate real time turbine process parameter data and said data acquisition and analysis unit based on said blade vibration signals and real time turbine process parameter data, transforming said blade vibration signals amplitude versus time into said frequency domain amplitude versus frequency spectrum and involving said long term trend of the amplitude of blade passing frequency and said trend of amplitude of blade natural frequency and to further carry out said correlation analysis to confirm absence of any further said distinguishing patterns of vibrations of healthy blades and of blades with incipient cracks based on any unwanted variation in said amplitude and frequency of BPF of said healthy blades and of said blades with incipient cracks in any stage of different stages of turbine rotor.

13. A system for non-intrusive on-line detection of turbine blade incipient crack as claimed in claim 12 wherein the said blade vibration signal and turbine process parameter data acquisition and analysis unit includes means for 3D spectrum plot, which is obtained by transforming said blade vibration signal amplitude versus time into frequency domain, including zoomed portion of BPF for examination of variation on amplitude and frequency of BPF.

14. A system for non-intrusive on-line detection of turbine blade incipient crack as claimed in claim 12 wherein the presence of one cracked blade in one stage induces significant modulation of BPF in that stage which is correlated to a trend of vibration and process data for identifying the damaged blade and the stage.

15. A system as claimed in claim 12 wherein said data acquisition and analysis unit enables said correlation analysis with Campbell diagram including on line exciting of steam turbine blades at its natural frequency by perturbing specific operating parameters and detecting the turbine blade natural frequency in the casing vibration signal to validate the natural frequency information as per the Campbell diagram of the respective stages.

* * * * *